July 29, 1941.  A. RUBINICH  2,251,005
FOOT PEDAL PROPELLED VEHICLE
Filed Dec. 17, 1940  2 Sheets-Sheet 1
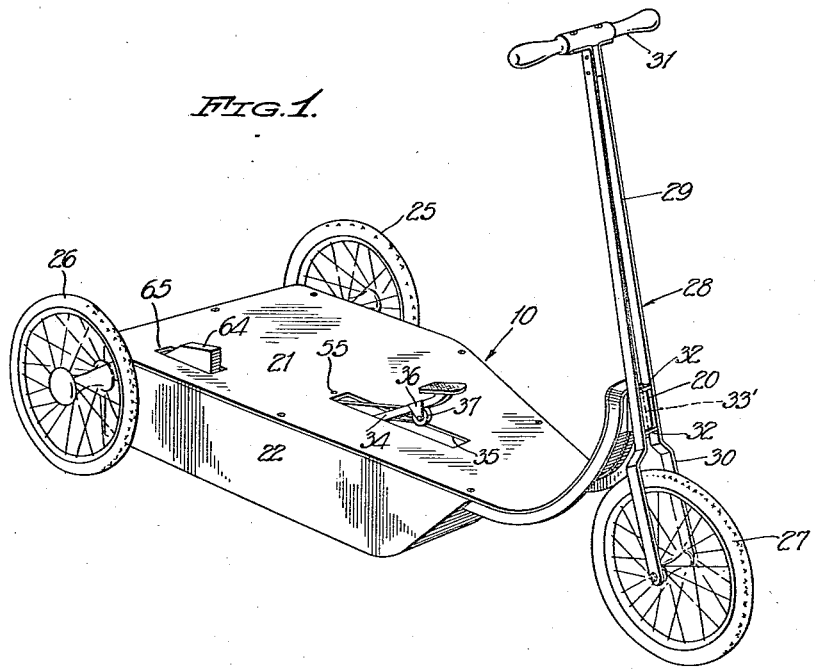
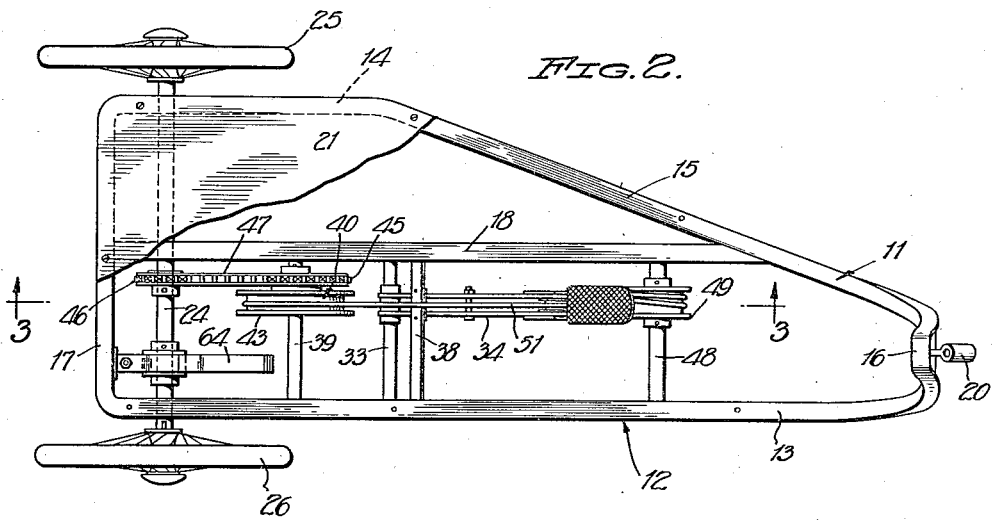
ANTHONY RUBINICH.
INVENTOR.
BY *Ely & Pattison*
ATTORNEYS.
WITNESS:

July 29, 1941.  A. RUBINICH  2,251,005

FOOT PEDAL PROPELLED VEHICLE

Filed Dec. 17, 1940  2 Sheets-Sheet 2

ANTHONY RUBINICH.
INVENTOR.

BY Ely & Pattison
ATTORNEYS.

WITNESS:

Patented July 29, 1941

2,251,005

UNITED STATES PATENT OFFICE 2,251,005

FOOT PEDAL PROPELLED VEHICLE

Anthony Rubinich, Hoboken, N. J.

Application December 17, 1940, Serial No. 370,523

5 Claims. (Cl. 280—258)

This invention relates to improvements in foot pedal propelled vehicles resembling in appearance a child's scooter, although the use of the vehicle is not restricted to children, for adults will derive exercise and pleasure therefrom, and by reason of the relatively high speed at which the vehicle may be propelled, a user may quickly travel from place to place.

Another feature of the invention is to provide a foot pedal actuated vehicle which may be set for low speed operation for children's use or for adult beginners and which may readily be set for relatively high speed for those users who become more proficient in the use of the vehicle.

A further feature of the invention resides in a three wheel platform type vehicle upon which a person may stand, while with one foot he may without tiring effort, impart a pressing force to the pedal which is greatly increased by the pedal actuated propelling mechanism, the return movement of the pedal being an automatic idling movement upon release of the foot pressure upon the pedal.

A still further feature of the invention is the provision of a foot pedal actuated vehicle of the scooter type which is properly balanced to prevent accidental tipping over when in operation, which is simple, inexpensive and sturdy of construction, attractive in design, and easy to actuate and control.

Other features of construction will become apparent as the following specification is read in conjunction with the accompanying drawings, in which:

Figure 1 is a perspective view of the improved vehicle set for low speed operation.

Figure 2 is a top plan view with the steering mechanism and underhousing removed and with a portion of the standing platform broken away.

Figure 3:
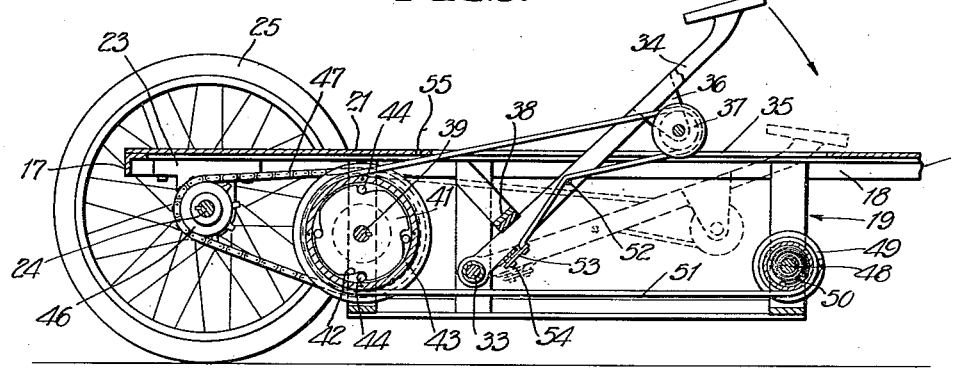
Figure 3 is an enlarged detail longitudinal sectional view on the line 3—3 of Figure 2, illustrating in dotted lines the down position of the foot pedal.

Referring to the drawings by reference characters, the numeral 10 designates my improved foot pedal actuated vehicle in its entirety, which includes a chassis 11 consisting of a horizontal metal frame 12, substantially harp-shaped in plan. The frame 12 comprises a straight right side rail 13 extending the length of the frame, a left side rail 14 having an angular forwardly extending portion 15 which converges with the side rail 13 to which it is connected by a nose 16. The rear ends of the side rails 13 and 14 are connected by a cross rail 17. A longitudinal brace rail 18 is connected to the rear rail 17 and to the angular portion 15 and this brace rail and the side rail 13 support a depending under frame structure 19. The front nose end of the frame 12 curves upwardly and the same is provided with a pivot knuckle 20. The horizontal frame 12 supports a flat metal platform 21 of a shape corresponding to the top plan shape of the frame and to which it is secured by bolts, welding, or otherwise. The frame 12 supports a depending housing 22 which prevents dust and dirt from reaching the driving mechanism presently to be described.

Journaled in spaced alined bearings 23 at the rear of the frame 12 is a rear axle 24 on which a left wheel 25 is freely mounted, and on which a right wheel 26 is keyed or fixedly mounted. A single front wheel 27 and steering mechanism 28 therefor is attached to the front of the frame 12. The steering mechanism includes rearwardly tilted steering post 29 having a fork 30 at its lower end in which the wheel 27 is journaled, and a double hand grip bar 31 at its upper end. The bearing knuckle 20 fits between a pair of alined bearing ears 32 on the post 29 and through which a pivot pin 33' passes. The front wheel 27 and the pivotal axis of the steering post is disposed to the right of longitudinal center of the frame 12 and substantially in alinement with the foot pedal of the propelling mechanism now to be described.

A transverse rod 33 is mounted in the frame 19 to which the lower end of a foot pedal 34 is pivoted and which pedal extends upwardly and forwardly through a slot 35 in the platform 21. The shank of the pedal is provided with a pair of spaced opposed ears 36 in which an idler pulley roller 37 is journaled. A fixed stop 38 is disposed in the path of upward return movement of the pedal for engagement by the shank thereof.

Rotatably mounted in the frame 19 rearward of the pedal is a transverse counter shaft 39 on which a one-way ratchet drive mechanism 40 is mounted. The mechanism 40 comprises a ratchet disk 41 fixedly mounted on the shaft 39 having spaced ratchet teeth 42 in its periphery, the shoulders of which face in a clockwise direction. Enclosing the disk 41 is a hollow pulley drum 43, there being roller members 44 between the ratchet teeth and the inner peripheral wall of the drum 43, whereby forward or clockwise rotation of the pulley drum 43 will cause the roller members to wedgingly engage the ratchet notches of the disk and cause the disk and shaft 39 to simultaneously rotate in the same forward direction. However, rearward turning of the pulley drum 43 will cause the roller members to move free of wedging engagement with the disk 41, whereupon no movement is imparted to the disk and shaft 39. Forward rotation of the counter shaft 39 is transmitted to the rear axle 24 by a sprocket and chain mechanism which includes a relatively large drive sprocket wheel 45 fixedly mounted on a hub extending from the disk 41, and a smaller alined sprocket wheel 46 is fixed to the axle 24, and passing over the alined sprocket wheels 45 and 46 is an endless sprocket chain 47.

Mounted in the frame 19 forward of the foot pedal 34 is a transverse shaft 48 fixedly mounted in the frame 19. Rotatably mounted on the shaft 48 is a hollow cable winding and unwinding drum 49. Contained within the drum is a drum winding convoluted spring 50 having one of its ends fixed to the shaft 48 and its other end attached to the inner peripheral wall of the drum. The convolutions of the spring are such that forward rotation of the drum winds the spring to increase the tension thereof while rearward winding rotation is imparted to the drum upon release of the forward rotative force. The spring is always under tension and secured to the exterior of the drum 49 is one end of a flexible element in the form of a cable 51. The drum 49, pulley drum 43, and guide pulley 37 are disposed in the same vertical plane, and the cable 51 extends rearward from the winding drum 49 and about the pulley drum 43. In Figure 3 I have illustrated the cable as being set for operation of the drive mechanism at low speed, therefore, the cable after passing around the pulley drum 43 extends forwardly over the top of the guide pulley 37, downwardly and rearwardly over a guide pin 52 fixed to the shank of the foot pedal, and the connecting link 53 thereon is fixedly secured by a bolt 54 to the shank of the foot pedal adjacent the pivotal end thereof. To set the cable 51 for imparting a higher propelling speed to the propelling mechanism, (Figure 4), the cable passes beneath and over the guide roller 37 and thence rearwardly where it is anchored through link 53 to the bolt 54 which is removed from the pedal 34 and inserted through a hole 55 in the platform 21 just rearward of the slot 35. By selectively changing the lead of the cable over the guide pulley 37 and changing its anchorage as outlined above, I am able to vary the length of pull of the cable passing over the drive pulley drum, thus varying the amount of propelling force imparted thereto.

Figure 4:
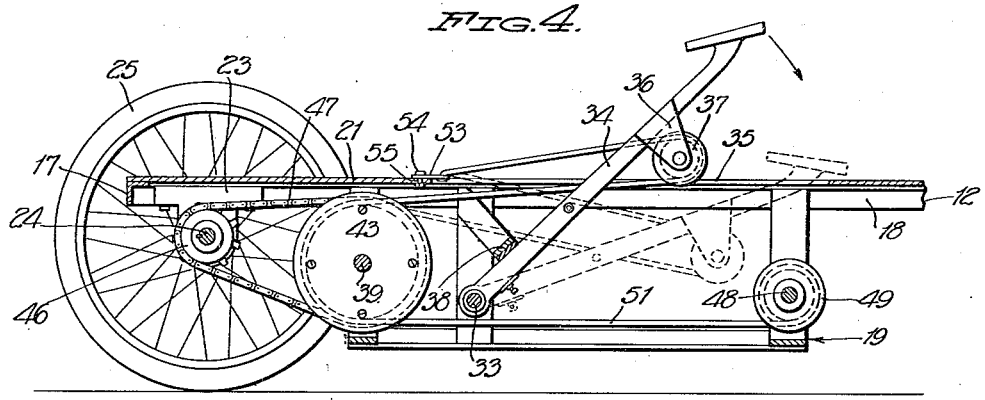
Figure 4 is a view similar to Figure 3, but showing the driving mechanism set for high speed operation and illustrating the driving ratchet drum and takeup drum in side elevation.
Figure 5:
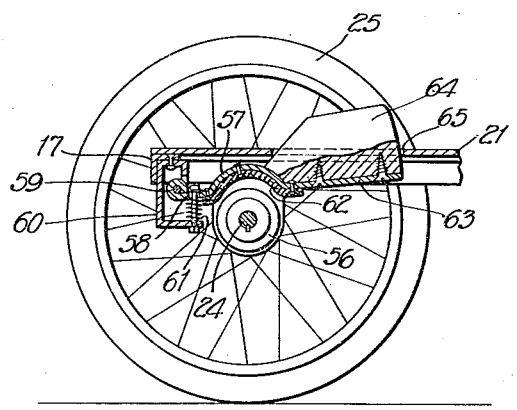
Figure 5 is an enlarged detail vertical sectional view through the brake mechanism.

The normal positions of the propelling mechanism are shown in full lines in Figures 3 and 4 of the drawings in which the foot pedal 34 is in its up position due to the tension of the spring actuated winding drum 49.

In use, an operator of the vehicle 10 stands with the left foot upon the platform, and the right foot upon the pedal 34 while grasping the handle bar 31 with both hands. A downward pressure applied by the operator's right foot will depress the foot pedal causing a forward pull to be exerted upon the upper lead of the cable and which causes the paying out of the cable from the winding drum 49 sufficient to compensate for the distance of the downward and forward movement of the foot pedal as illustrated in dotted lines in Figures 3 and 4. The pull on the cable exerted by the depression of the foot pedal causes the cable to impart a forward rotation to be imparted to the drive pulley drum 43, which rotation is transmitted to the ratchet disk 41, shaft 39, sprocket wheel 45, sprocket chain 47 to the sprocket 46, axle 24, to the drive wheel 26, causing the vehicle to roll forward. As the pedal completes its downward movement, the operator releases his push on the pedal whereupon the spring actuated winding drum 49 rewinds a portion of the cable thereon and returns the foot pedal 34 to its raised or normal position. This return movement of the cable turns the drive pulley drum in a rearward direction at which time it frees itself from the ratchet disk 41 whereupon the vehicle is coasting forwardly. Thus by successively pressing down upon the foot pedal and releasing the same, the vehicle may be propelled forwardly at a relatively high speed requiring but a small amount of effort upon the operator. The vehicle is steered by turning the front wheel 27 to the right and left by manipulating the hand grip 31. By reason of the shape of the chassis and the positioning of the actuating foot pedal and the driving mechanism in line with the single front wheel, the vehicle is maintained in balance under the weight of foot movements of the operator to prevent accidental tipping over of the vehicle when in use.

The vehicle 10 is provided with a foot actuated brake for slowing down and bringing the vehicle to a stop. The brake consists of a brake drum 56 fixed to the rear axle 24 to the right of the sprocket wheel 46 which is engaged by a segmental brake shoe 57 having a tail piece 58 extending rearwardly which is pivoted at 59 to a bracket 60 secured to and depending from the rear rail 17. A spring 61 is interposed between the tail-piece 58 and the bracket tending to normally hold the brake shoe away from the brake drum 56. The braking surface of the brake shoe is provided with a brake lining 62. An arm 63 extends forwardly from the brake shoe and has an upstanding pedal block 64 secured thereto which normally projects upwardly through a slot 65 in the platform 21. To actuate the brake, the operator removes his right foot from the pedal 34 and with the heel of the right foot he applies a downward pressure upon the heel block 64 thus bringing the brake shoe 57 in frictional braking contact with the brake drum 56.

Figure 6:
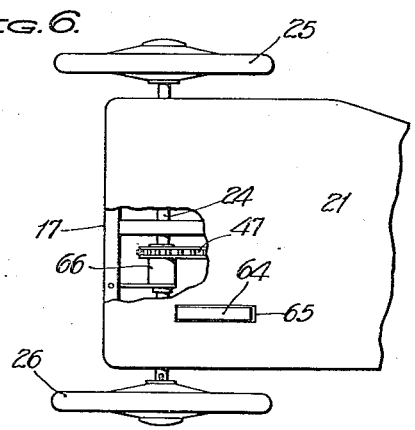
Figure 6 is a fragmentary top plan view with part of the platform broken away and illustrating a coaster-brake mechanism by which the rear driving axle may freely rotate to permit rolling of the vehicle in a backward direction.

In the form of the invention shown in Figures 1 to 5, the rear axle 24 may only turn in a forward propelling direction due to the ratchet operated drive pulley mechanism, but the axle may be equipped with a clutch mechanism 66 similar to the bicycle coaster brake as shown in Figure 6. The same is interposed between the sprocket 46 and the axle 24 whereby the rear wheels may freely turn in a rearward direction relative to the sprocket and the axle be clutched to the sprocket for forward driving rotation.

While I have shown and described what I consider to be the preferred embodiment of my invention, I wish it to be understood that such changes and alterations as come within the scope of the appended claims may be resorted to if desired without departing from the spirit of the invention.

Having thus described the invention, what I claim as new and desire to secure by Letters Patent of the United States, is:

1. A wheel vehicle including a platform body having a chassis frame, a rear drive axle journaled in said chassis frame, a pair of wheels, one of said wheels being fixed to said axle and the other being freely rotatable thereon, a foot pedal pivoted to said chassis frame, a roller mounted on said foot pedal, a spring actuated winding drum journaled in said frame, a ratchet operated driving pulley wheel journaled in said frame rearward of the winding drum and roller for driving movement in a forward direction and for free idle movement in a rearward direction, a cable having one of its ends secured to said winding drum and extending rearwardly and about the ratchet operated driving pulley wheel and forwardly over the top of the roller, the other end of the flexible cable being fixed to said foot pedal below said roller, whereby downward pressure applied to the foot pedal will cause a portion of the cable to unwind from the winding drum and impart a turning forward driving movement to the ratchet driving drum and release of pressure upon said foot pedal will permit the spring actuated winding drum to take up slack in the cable and return the foot pedal to raised normal position and impart a free idling movement to the ratchet operated drum, and a drive connection between the ratchet operated drum and the rear axle for imparting a forward driving movement to the rear axle upon the forward driving rotation of the ratchet operated driving drum.

2. A wheel vehicle including a platform body having a chassis frame, a rear drive axle journaled in said chassis frame, a pair of wheels, one of said wheels being fixed to said axle and the other being freely rotatable thereon, a foot pedal pivoted to said chassis frame, a roller mounted on said foot pedal, a spring actuated winding drum journaled in said frame, a ratchet operated driving pulley wheel journaled in said frame rearward of the winding drum and roller for driving movement in a forward direction and for free idle movement in a rearward direction, a cable having one of its ends secured to said winding drum and extending rearwardly and about the ratchet operated driving pulley wheel and forwardly under and over the roller and thence rearwardly, the other end of the cable being fixedly secured to said body, whereby downward pressure applied to the foot pedal will cause a portion of the cable to unwind from the winding drum and impart a turning forward driving movement to the ratchet driving drum and release of pressure upon said foot pedal will permit the spring actuated winding drum to take up slack in the cable and return the foot pedal to raised normal position and impart a free idling movement to the ratchet operated drum, and a drive connection between the ratchet operated drum and the rear axle for imparting a forward driving movement to the rear axle upon the forward driving rotation of the ratchet operated driving drum.

3. In a foot pedal operated wheel vehicle, a chassis frame, a rotatable axle journaled at the rear of said chassis frame, a pair of wheels, one of said wheels being fixed to said axle and the other freely turnable thereon, a sprocket wheel fixed to said axle, a counter shaft journaled in said chassis frame forward of and parallel to the axis of said axle, a drive pulley wheel freely mounted on said counter shaft, ratchet means drivingly connecting the drive pulley wheel with the shaft upon forward turning movement of the drive pulley wheel and for enabling free movement of the drive pulley wheel relative to the counter shaft upon rearward turning movement of the drive pulley wheel, a sprocket wheel fixedly connected to said ratchet means and disposed in alinement with the first mentioned sprocket wheel, a sprocket chain passing over the alined sprocket wheels, a foot actuated pedal pivoted to said chassis frame and disposed forward of said drive pulley wheel, a guide pulley mounted on said pedal, a flexible element passing about the drive pulley, one of the end portions of the flexible element passing over the guide pulley and being connected to a fixed anchorage, the other end portion of the flexible element extending forwardly from said drive pulley wheel, and a spring actuated slack take up means to which the last mentioned end portion of the flexible element is connected, whereby foot pressure applied to said foot pedal will cause said flexible element to impart a forward driving movement to said drive pulley and to said counter shaft by reason of said ratchet means and cause forward rotation of the rear axle through the sprocket wheels and chain, and return movement of the foot pedal will impart a reverse free idling turning movement to said drive pulley wheel.

4. In a foot pedal operated wheel vehicle as set forth in claim 3 including free wheeling clutch means between the rear axle and the sprocket wheel mounted thereon for operatively driving the axle in a forward direction of rotation and for permitting free backward rotation of the axle relative to the sprocket wheel.

5. In a wheel vehicle, a body having a chassis frame, a drive axle journaled in said chassis frame, a foot pedal pivoted to said chassis frame, a roller mounted on said foot pedal, a spring actuated winding drum journaled in said frame, a ratchet operated driving pulley wheel journaled in said frame rearward of the winding drum and roller for driving movement in a forward direction and for free idle movement in a rearward direction, a cable having one of its ends secured to said winding drum and extending rearwardly and about the ratchet operated driving pulley wheel and forwardly about the roller, the other end of the flexible cable being fixed, whereby downward pressure applied to the foot pedal will cause a portion of the cable to unwind from the winding drum and impart a turning forward driving movement to the ratchet driving drum and release of pressure upon said foot pedal will permit the spring actuated winding drum to take up slack in the cable and return the foot pedal to raised normal position and impart a free idling movement to the ratchet operating drum, and a drive connection between the ratchet operated drum and the drive axle for imparting a forward driving movement thereto upon the forward driving rotation of the ratchet operated driving drum.

ANTHONY RUBINICH.